May 7, 1957 E. O. ANDERSON 2,791,233
PULSATING TYPE TIRE GAUGE
Filed Dec. 1, 1953 2 Sheets-Sheet 1

INVENTOR
ERNEST O. ANDERSON
BY
Charles S. Evand
his ATTORNEY

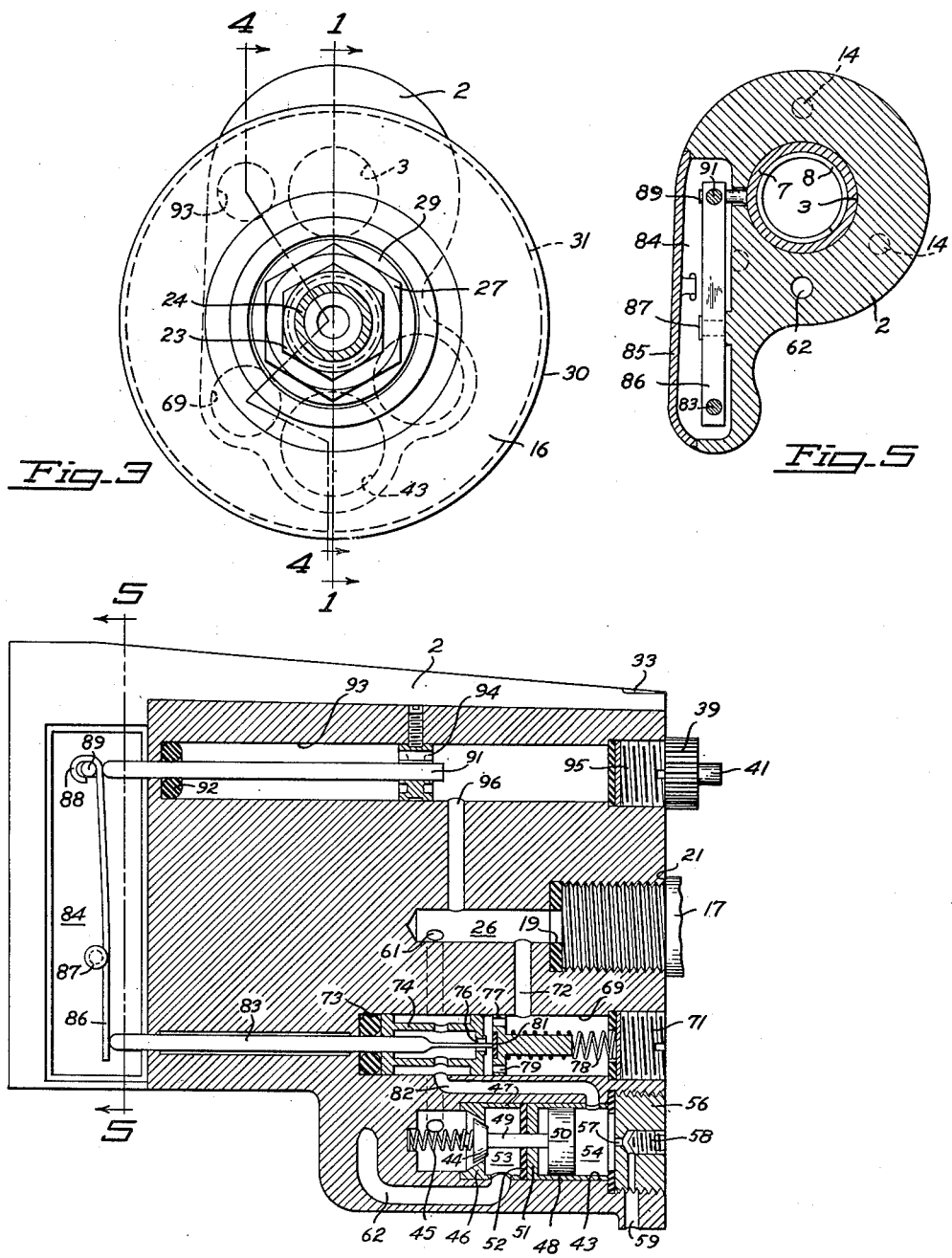

United States Patent Office 2,791,233
Patented May 7, 1957

2,791,233

PULSATING TYPE TIRE GAUGE

Ernest O. Anderson, Boulder Creek, Calif., assignor to Barmotive Products, Incorporated, San Leandro, Calif., a corporation of California Application December 1, 1953, Serial No. 395,490

8 Claims. (Cl. 137—224.5)

My invention relates to air pressure gauges used for inflating pneumatic tires.

One of the objects of the invention is the provision of an air pressure inflation gauge which accurately and automatically shuts off the delivery of air at a predetermined pressure in the tire.

Another object of the invention is the provision of a gauge which is closely accurate over the entire range of pressures usually found in passenger and truck tires, so that the need for separate low and high pressure gauges is avoided.

Another object of the invention is the provision of a lighter and more easily handled gauge structure.

Still another object is the provision of a gauge in which there is a direct mechanical but flexible connection between the automatic control devices and the pilot valve which controls the main valve, both features contributing strongly to smooth, fast and accurate operation over a wide range of pressures.

Another object of my invention is the provision of a gauge in which the control or pilot valve is first cracked open by mechanical connection responsive to pressure of a selectively loaded spring, and then its further opening effected almost simultaneously by mechanical connection responsive to full tank pressure.

My invention has other objects which will be explained in the following description of the invention which is illustrated in the drawings. It is to be understood, however, that the invention is not limited to the embodiment described, but may be included in a variety of forms as set forth in the claims.

Referring to the drawings:

Fig. 3 is an end elevation of the gauge taken in the direction of the arrow 3 at the right of Fig. 1.

Figure 1:
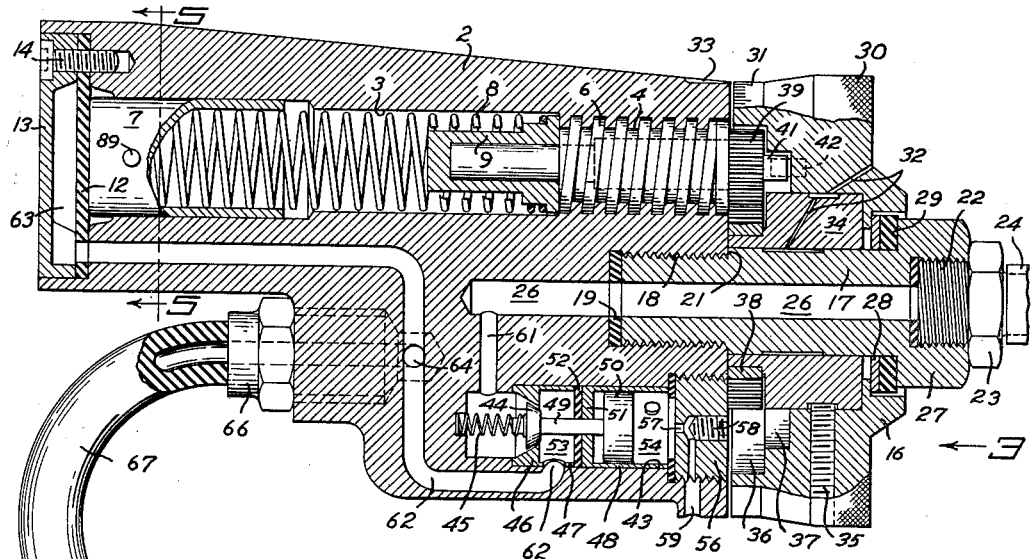
Fig. 1 is a vertical sectional view with the gauge held in a nominal horizontal position as shown in Fig. 2. The plane of section is indicated by the line 1—1 of Fig. 3.

Fig. 4 is a five-part compound sectional view of the main body of my gauge taken in the zig-zag line 4—4 of Fig. 3. The adjusting knob 16 and retaining pin 17, and the connecting hoses shown in Fig. 1 are omitted in this view. The view is distorted in height because of planar alignment of the several planes of section, and in that respect may be regarded as diagrammatic.

Fig. 5 is a vertical sectional view taken in the plane indicated by the line 5—5 in both Figs. 1 and 4.

Broadly considered, my gauge comprises a block of irregular shape but light and convenient to the hand; and connected at one end by a long flexible supply hose to a supply or pressure tank; and at the other end connected to a short flexible service hose terminating in a conventional inflation nozzle or tire chuck, which is essentially a check valve opening upon its proper application to the tire valve stem.

Between the inlet from supply and the outlet to service, is a main passage controlled by a main valve, the opening of which provides a continuous passage between supply tank and tire chuck; and when the latter is applied to the tire valve stem, such passage is continued through the tire chuck and tire valve stem into the inner tube.

For convenience, the main passage on the inlet side of the main valve may be termed the inlet passage; and on the outlet side, the discharge passage.

A control piston, spring-loaded on one side to a selected value by a graduated manually turned knob, is slidably arranged in the block. On the other side of the control piston is a balance chamber which communicates at all times with the discharge passage.

A resilient lever operatively connects mechanism including the control piston and a small air piston responsive to tank air pressure, to a pilot valve, the opening and closing of which effects the opening and closing of the main valve.

Movement of the control piston in one direction is dependent on main spring pressure as determined by the setting of the graduated knob, and in the opposite direction by pressure in the balance chamber. When pressure in the balance chamber is greater than the selected spring setting, the control piston is pushed back against the main spring pressure, leaving the resilient connecting lever in such position that the pilot valve remains closed and no air flows through the main valve.

When pressure in the balance chamber falls below the selected spring setting, the spring pushes the control piston into the chamber, so that by action, first of the control piston and then of the air piston, the resilient lever is rocked to crack open the pilot valve and then to fully open it to effect opening of the main valve for an instant to allow air to flow from the inlet passage into the discharge passage and balance chamber. In full operation, the action of the two pistons is almost simultaneous.

When my gauge is first connected to the supply hose and the knob turned to a setting which loads the spring to, say, 30 lbs., the control piston and its related air piston open the pilot valve to start a cycle of operations which end with a pressure in the balance chamber and service hose of 30 lbs. In ordinary use in a service station, this is the condition of the gauge, except of course for variations in spring loading due to different settings of the knob. When the tire chuck is applied to a tire having a lower pressure, pressures in gauge and tire equalize and the balance chamber pressure drops, which permits the two pistons to initiate another cycle of operations which end when the pressure in the balance chamber again reaches 30 lbs., the connected tire of course also having the same pressure. Removal of the gauge tire chuck from the tire valve stem permits both gauge and tire to retain the attained pressure.

Figure 2:
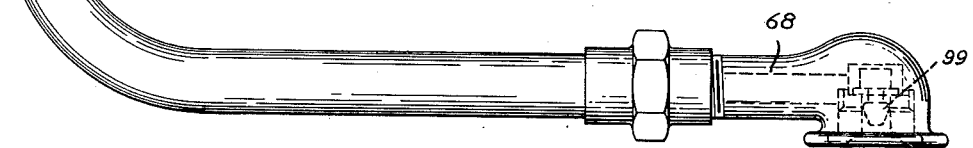
Fig. 2 is a perspective view of my gauge as it is conveniently held in one hand during application of the inflation nozzle or tire chuck to the tire valve stem. Hose connections are omitted from the view.
Figure 2:
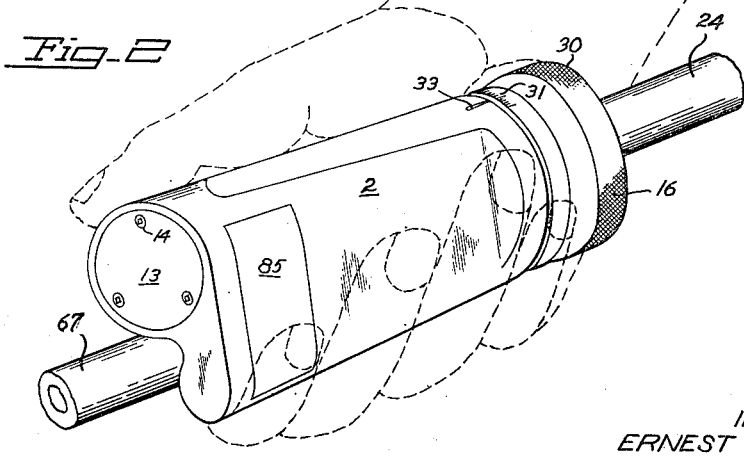

In greater detail and referring by reference numbers to the drawings, my gauge comprises a block 2 of generally cylindrical but somewhat irregular conformation as shown in Fig. 2. There are several chambers in the block extending parallel to its main longitudinal axis, and in which operating parts are arranged. These various chambers and the connecting passages may be formed by a molding procedure, or by drilling and boring with suitable plugging of open ends or by a combination of these operations.

The largest of these chambers is the main bore 3, having threads 4 at one end (right end of Fig. 1) engaged by the threaded adjusting spindle 6. Slidable in the opposite end of the bore is the hollow control piston 7, between which and the spindle 6 is the adjusting spring 8 and bearing thimble 9.

The piston end of the bore is closed by a rubber diaphragm 12, secured in place by the cap 13 held by screws 14.

Means are provided for manually turning the spindle to compress the spring to a degree corresponding to a desired tire pressure as shown on a graduated scale appearing on a knurled adjusting knob 16, rotatably mounted on the end of the block for that purpose. A hollow retaining pin 17 is fixed centrally in the end of the block by means of threads 18, a gasket 19 sealing the end of the pin when the shoulder 21 seats.

The outer end of the pin is threaded to receive the stud end 22 of the fitting 23 on the end of the long flexible supply hose 24 connecting my gauge to the tank or receiver (not shown) holding the air under pressure, which is to be used to inflate the tires. The passage in the long flexible supply hose and its fitting 23 is continued in the inlet passage 26 in the pin and block. It will be understood that in service, tank pressure is maintained within this main inlet passage.

Journalled on the retaining pin 17, and held thereon under its hexagonal head 27 by annular plate 28 and resilient gasket ring 29, is the adjusting knob 16, with knurled periphery 30 and graduated periphery 31. Oil ducts 32 provide for lubrication of the bearing and adjacent operating parts. An index mark or narrow bead 33 on the body provides means for evaluating the graduated setting of the knob.

In order to facilitate coordination of the parts, the knob is made with a separate hub 34, on which the knob is selectively locked by one or more set screws 35.

The under surfaces of the knob and hub are formed with an annular groove 36, in the bottom of which is a narrower groove 37. The inner wall of the groove 36, forms a concentric hub on which a ring gear 38 is fixed as by a force fit. The gear meshes with a pinion 39, fixed on the upper end of the adjusting spindle 6 and lying in the groove 36. The extreme end 41 of the spindle extends into the groove 37 to be engaged at each end of the rotary movement of the knob by a stop pin 42 fixed in the groove bottom.

The interposition of gears between knob and spindle makes possible a much wider range of compression of the adjusting spring 8 with a single revolution of the knob from 0 on one side of the stop pin to 80 or more on the other side. This covers the maximum range in pressures in tires supplied by the ordinary service station. With a wider range of compression for the adjusting spring, comes a lighter spring and increased sensitivity, so that a very high degree of accuracy results in each setting within the extreme ranges of pressures indicated by the knob graduations.

Valve means are provided to control the flow of air under pressure through the implement until the pressure indicated on the knob graduations is equaled in the tire. Parallel to the main bore and diametrically opposite to it is a bore 43 in which a main valve 44 is pressed by the spring 45 against the seat 46, formed on one end of the liner sleeve 47. A second sleeve 48 completes the lining of the bore 43. The main valve is fixed on one end of stem 49, on the other end of which is fixed the piston 50 slidable in the sleeve 48. One end of the sleeve 48 is formed with a flange 51 enclosing the stem 49. A soft rubber gasket 52, held between the sleeves, seals the chamber 53 on the open side of the valve 44. The end of the bore next the piston forming the pressure chamber 54 is closed by the screw plug 56 in which a vent 57, adjustable in size by the screw 58, is arranged to register with a continuation 59 in the adjacent wall of the block.

The end of the bore 43 on the inlet side of the main valve is connected by the duct 61 to the central inlet passage 26 so that tank pressure obtains in the bore 43 on the closed side of the main valve, that is, in the main valve chamber.

On the opposite or open side of the main valve, the chamber 53 is connected by the passage 62 to the balance chamber 63 on the side of the diaphragm 12 opposite to the control piston. The passage 62 is also connected by the passage 64 and the fitting 66 to the short service hose 67 having on its free end the tire chuck 68 containing the conventional check valve 99; so that whatever air under pressure passes the main valve equalizes almost instantly in the balance chamber and service hose; and if the nozzle of the latter has been applied to the tire valve stem, then the equalizing extends to the tire as well.

Means operatively controlled by the control piston are provided for opening the main valve to allow air to flow from the inlet passage through the main valve to the balance chamber and tire. Parallel to the main bore is a pilot valve bore 69, closed with the screw plug 71, but in permanent communication with the inlet passage 26 by the duct 72.

Snugly fitting against rubber gasket rings 73 in the end of the bore is a cage 74 having a pilot valve seat 76, in position to be closed by the pilot valve 77, normally pressed by spring 78 against its seat. The valve is slidably supported in the bore after the manner of a piston in a cylinder; and has apertures 79 therethrough to permit the free passage of air to the near wall of the cage surrounding the valve seat. The central area of the valve on the seat side is faced with a resilient pad 81 of rubber to insure full closing under spring pressure. That portion of the bore holding the cage is connected by duct 82 to the vented chamber 54, so that when the pilot valve opens, air from the inlet passage flows through the valve cage 74, and duct 82 to the chamber 54, where it presses the piston 50 to open the main valve 44.

It will be observed that while pressures per unit area against the piston 50 to open the main valve, and against the main valve to keep it closed are the same immediately following the opening of the pilot valve, the piston area is larger than the valve area so that the valve opens instantly and against the additional resistance of the valve spring 45. The venting of the chamber 54 prevents out-of-cycle build-up of pressure in the chamber; and by adjusting the size of the vent by the adjusting screw 58, the speed of operation of the gauge may be controlled.

Movement of the pilot valve 77 is controlled by devices including the control piston 7. Slidably arranged in the block in axial alignment with the pilot valve bore 69 is a push rod 83, extending through the gasket ring 73, and cage 74, and impinging on the under or closing side of the pilot valve. At its opposite end, the rod extends into the chamber 84, closed by the resiliently engaged cover plate 85; and impinges upon the short arm of the spring lever 86 mounted for a very small rocking movement on the pivot pin 87 fixed in the block.

The other end of the long arm of the lever is formed into an elongated loop 88 extending at right angles, and enclosing a connecting pin 89 fixed in the side of the control piston 7 and extending through a slot in the thin wall separating the piston chamber and the chamber 84 as shown in Fig. 5. The lever is thus connected to the control piston by a slot-and-pin connection which permits a small movement of both piston and lever independent of the other.

Impinging on the end of the long arm of the lever opposite the connecting pin is a push rod 91 extending through gasket ring 92 into the bore 93 and through the slide bearing 94. This bore is closed by the screw plug 95, and a duct 96 puts the bore in constant communication with the inlet passage 26. The push rod 91 is therefore in effect a piston and responsive to tank air pressure over a small area, tending to keep it tight against the base of the loop 88 which in turn tends to lie snug against the pin 89. With this position of the parts, the opposite end of the lever is stressed against the push rod 83 which tends to open the pilot valve. It should be understood that the actual pressure on the piston 91 is less than on the closed pilot valve which insures against opening of the pilot valve before it is cracked open by the control piston.

Thus in the very first setting of the gauge and before air is turned into the supply hose, the control piston 7 moves against the diaphragm and toward the balance chamber, the pin 89 engaging the outer portion of the loop 88, and rocking the lever to crack open the pilot valve. Then when air under pressure from the tank flows into the inlet passage 26 it floods into all the constantly open connecting passages and ducts, so that air at tank pressure is in the main valve chamber tending with spring 45 to keep the main valve 44 tightly closed; also in the pilot valve chamber of bore 69; and also in bore 93 where it pushes upon the rod (or piston) 91 to press the resilient lever against the pin 89, still further stressing the lever and fully opening the pilot valve.

Note that at this time the pin is at its extreme left position (the control piston having been pushed about 1/16" toward the balance chamber by the adjusting spring) and that the pin lies in the base of the loop as seen in Fig. 4. The pilot valve is therefore wide open, the push rod 83, actuated by the lever 86 having pushed it wide open to allow a puff of air to pass through the cage 74, and duct 82 to chamber 54, actuating the piston 50 to open the main valve 44. This permits a puff of air past the main valve and into the passage 62, and thence to balance chamber 63 and service hose which is closed at its valved end. With the sudden increase of pressure in the balance chamber, the control piston is thrust inwardly against the adjusting spring, simultaneously rocking the lever 86 to release the push rod 83 from the pilot valve, allowing the valve to close and cutting off the flow of air to the chamber 54, which therefore allows the main valve to close under thrust of spring and tank pressure air.

The piston now bounces back about 1/16" to the left, taking up the small lag of about 1/32" in the loop, and leaving the pin in the outer end of the loop. This movement of the control piston is sufficient to stress the spring lever 86 enough to crack open the pilot valve, leaving the lever 86 for a fraction of a second wholly subject to the leftward pressure of the piston 91 exposed to tank pressure in bore 93. This rocks the lever about 1/32" to seat the base of the loop against the pin, as in Fig. 4, and operates to further stress the lever to open the pilot valve fully.

The parts are so proportioned and arranged that with successive puffs of air through the main valve the pressure in the balance chamber increases to the point of balance with the spring loading, whereupon the piston stops its reciprocating movement at its inward position (the point of balance) and the pilot valve remains closed. The resilient lever smooths out the action of the parts and compensates for the small variation in amplitude of vibration of the control piston. It also imparts a snap to the opening movement of the pilot valve, and insures a full opening with each stroke.

The action is extremely rapid, each puff of air through the pilot valve, opening the main valve, and injecting another small increment of air into the balance chamber until a balancing pressure is reached. Extremely fast or relatively slow pulsations are secured by adjusting the capacity of the vent 57.

Now if the tire chuck 68 be applied to the tire valve stem there is an instant equalization of pressure in tire, balance chamber and the connecting passages. If the tire pressure is higher than the gauge setting of 30 lbs. there is an increase in pressure in the balance chamber and a small inward movement of the piston, but this does not actuate the push rod 83, and no other change is observed.

If the tire pressure is less than the gauge setting, there is also an equalization but at a lower pressure, which allows the adjusting spring to push the control piston outwardly into the diaphragm as the first movement of further cycles of operation of pilot and main valves, until with repeated puffs of air through the main valve, equalization in tire and balance chamber at 30 lbs. obtains.

It should be noted that air pressure against the push rod or piston 91 is somewhat less than the combined air and spring pressure against the push rod 83; and that the pivot pin 87 is placed to give the push rod or piston 91 a leverage sufficient to compensate for the counterthrust of the spring 78 which resists opening of the pilot valve. Such balancing of pressures between parts makes the piston more sensitive to varying pressures in the balance chamber.

Perhaps the operation of my gauge will be best understood if the control piston be imagined to vibrate back and forth, the loading spring pushing it to the left (Fig. 1) and the air in the balance chamber imparting successive blows to move it to the right with each puff or increment passing the main valves.

As the spring loaded control piston moves to the left, it cracks open the pilot valve. The air loaded piston then continues the opening movement to maximum. As the control piston is kicked back to the right by the puff of tank pressure air, it also pushes back the air piston so as to release the stress on the lever permitting the pilot valve to be closed by its own spring.

Finally pressure in the balance chamber equals the adjusting spring pressure; and the control piston stops vibrating. At this time the pilot valve is closed and also the main valve; and pressure in the discharge passage and connecting balance chamber and tire corresponds with the graduate setting of the knob.

I claim:

1. A tire inflation gauge comprising a block, inlet and discharge passages in the block, a normally spring-closed main valve interposed between the two passages, a valve normally closing the end of the discharge passage, a balance chamber in communication with the discharge passage, a control piston responsive to pressure in the balance chamber, a spring bearing against the piston to move it against the chamber pressure, means for applying a selected compressive stress to the spring, a pressure chamber adjacent the main valve, means responsive to pressure in the pressure chamber for opening the main valve, a pilot passage connecting the pressure chamber to the inlet passage, a normally spring-closed pilot valve in the pilot passage, and means including a lever arm pivotally mounted in the block and operatively connecting the control piston to the pilot valve.

2. A tire inflation gauge in accordance with claim 1 in which the lever arm is a resilient flat spring.

3. A tire inflation gauge comprising a block, inlet and discharge passages in the block, a normally spring-closed main valve interposed between the two passages, a valve normally closing the end of the discharge passage, a balance chamber in communication with the discharge passage, a control piston responsive to pressure in the balance chamber, a spring bearing against the piston to move it against the chamber pressure, means for applying a selected compressive stress to the spring, a pressure chamber adjacent the main valve, means responsive to pressure in the pressure chamber for opening the main valve, a pilot passage connecting the pressure chamber to the inlet passage, a normally spring-closed pilot valve in the pilot passage, means including a resilient lever connecting the control piston operatively to the pilot valve, and means responsive to air pressure in the inlet passage for stressing said lever to open the pilot valve.

4. A tire inflation gauge comprising a block, inlet and discharge passages in the block, a normally spring-closed main valve interposed between the two passages, a valve normally closing the end of the discharge passage, a balance chamber in communication with the discharge passage, a control piston responsive to pressure in the balance chamber, a spring bearing against the piston to move it against the chamber pressure, means for applying a selected compressive stress to the spring, a pressure chamber adjacent the main valve, means responsive to pressure in the pressure chamber for opening the main valve, a pilot passage connecting the pressure chamber to the inlet passage, a normally spring-closed pilot valve in the pilot passage, a resilient lever operatively connected to the pilot valve at one end and having a pin-and-slot connection to the control piston at its other end, and means responsive to air pressure in the inlet passage and stressing the lever at its said other end in a direction to open the pilot valve.

5. A tire inflation gauge comprising a block, inlet and discharge passages in the block, a normally spring-closed main valve interposed between the two passages, a valve normally closing the end of the discharge passage, a balance chamber in communication with the discharge passage, a control piston responsive to pressure in the balance chamber, a spring bearing against the piston to move it against the chamber pressure, means for applying a selected compressive stress to the spring, a pressure chamber adjacent the main valve, means responsive to pressure in the pressure chamber for opening the main valve, a pilot passage connecting the pressure chamber to the inlet passage, a normally spring-closed pilot valve in the pilot passage, means including a lever connecting the control piston operatively to the pilot valve, and means responsive to air pressure in the inlet passage for moving said lever to open the pilot valve.

6. A tire inflation gauge comprising a block, inlet and discharge passages in the block, a normally spring-closed main valve interposed between the two passages, a valve normally closing the end of the discharge passage, a balance chamber in communication with the discharge passage, a control piston responsive to pressure in the balance chamber, a spring bearing against the piston to move it against the chamber pressure, means for applying a selected compressive stress to the spring, a pressure chamber adjacent the main valve, means responsive to pressure in the pressure chamber for opening the main valve, a pilot passage connecting the pressure chamber to the inlet passage, a normally spring-closed pilot valve in the pilot passage, means including a resilient lever and a piston responsive to air pressure in the inlet passage cooperatively connecting the control piston to the pilot valve.

7. A tire inflation gauge comprising a block, inlet and discharge passages in the block, a normally spring-closed main valve interposed between the two passages, a valve normally closing the end of the discharge passage, a balance chamber in communication with the discharge passage, a control piston responsive to pressure in the balance chamber, a spring bearing against the piston to move it against the chamber pressure, means for applying a selected compressive stress to the spring, a pressure chamber adjacent the main valve, means responsive to pressure in the pressure chamber for opening the main valve, a pilot passage connecting the pressure chamber to the inlet passage, a normally spring-closed pilot valve in the pilot passage, means including a lever pivotally mounted in the block and interposed between the control piston and the pilot valve for cracking open the pilot valve, and means responsive to air pressure in the inlet passage for additionally moving said lever to fully open the pilot valve.

8. A tire inflation gauge in accordance with claim 7 in which the lever is a flat spring.

References Cited in the file of this patent

UNITED STATES PATENTS

| | | |
|---|---|---|
| 2,063,783 | Beath | Dec. 8, 1936 |
| 2,537,869 | Willson | Jan. 9, 1951 |
| 2,638,113 | Sturmer | May 12, 1953 |
| 2,661,760 | Anderson | Dec. 8, 1953 |